T. W. PEIRCE.
Bee Hive.
No. 53,475. Patented March 27, 1866.
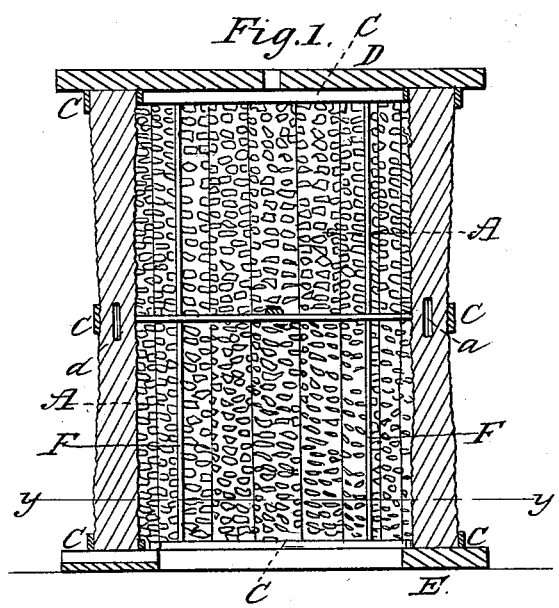
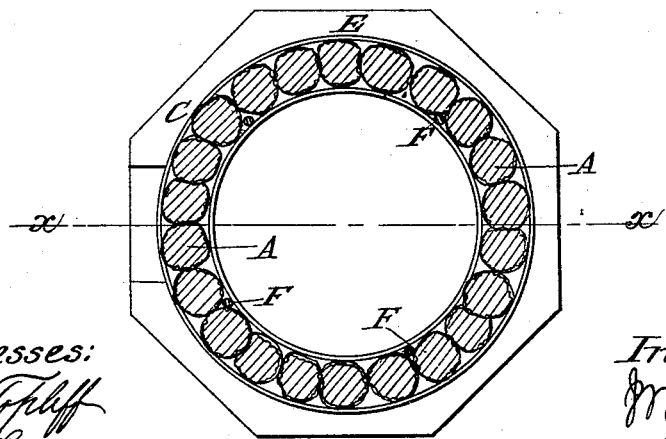

UNITED STATES PATENT OFFICE.

T. W. PEIRCE, OF MINNEAPOLIS, MINNESOTA.

IMPROVEMENT IN BEE-HIVES.

Specification forming part of Letters Patent No. 53,475, dated March, 27 1866.

*To all whom it may concern:*

Be it known that I, T. W. PEIRCE, of Minneapolis, in the county of Hennepin and State of Minnesota, have invented a new and Improved Bee-Hive; and I do hereby declare that the following is a full, clear, and exact description thereof, which will enable others skilled in the art to make and use the same, reference being had to the accompanying drawings forming part of this specification, in which—

Figure 1 is a vertical central section of my invention, taken in the line $x\ x$, Fig. 2; Fig. 2, a horizontal section of the same, taken in the line $y\ y$, Fig. 1.

Similar letters of reference indicate like parts.

All apiarians agree in the opinion that a bee-hive should be of a uniform temperature—lower than that of the average of the external air in summer, and warmer than it in winter. Various plans have been devised in order to accomplish this result. Double-walled hives have been used, the space between filled in with a non-conducting material, and hives have been covered in winter with earth, straw, &c. These plans, however, have not been generally adopted, the double-walled hives being expensive, and the covering of the hives in winter and the uncovering of them in the spring attended with considerable trouble.

My invention consists in constructing a bee-hive of corn-cobs, substantially as hereinafter set forth, whereby a cheap and good non-conducting material is obtained, and one which will absorb the moisture in the hive, keeping the same dry and in a healthy state.

In the drawings a bee-hive is represented constructed with a wall or side of a single thickness of cobs, but of a height formed of two cobs placed over another.

A represents the lower cobs, placed in the form of a circle, and resting upon a proper base, E; and A′ represents the upper row of cobs, placed directly on the lower row, A, and connected thereto by dowel-pins $a$ or any equivalent means. The two rows of cobs are retained in proper position by means of internal and external hoops or bands, C C, and by the top board, D, and base E, which are held in close contact with the top and bottom of the hive by means of rods F.

Corn-cobs are a good non-conductor of heat, and they will absorb moisture and keep the interior of the hive dry. The wall may be made of one or two thicknesses of cobs and of two or more lengths of cobs in height, as required. It may be ventilated equally as well as hives constructed of other material, and spare honey-boxes may be placed on its top, constructed of cobs like the main hive. It may be constructed at a very small cost. The cobs may be obtained in rural districts for little or nothing, and the other parts, hoops, top, and base will cost but a trifle.

Having thus described my invention, I claim as new and desire to secure by Letters Patent—

A bee-hive constructed of corn-cobs, substantially as shown and described.

The above specification of my invention signed by me this 2d day of September, 1865.

T. W. PEIRCE.

Witnesses:
  J. C. WILLIAMS,
  W. H. LAUDERDALE.